United States Patent Office 3,418,153
Patented Dec. 24, 1968

3,418,153
METHOD OF IMPARTING ABRASION AND SCRATCH RESISTANCE TO GLASS SURFACES AND GLASS ARTICLES PRODUCED THEREBY
Leon Levene, Toledo, Ohio, assignor to Owens-Illinois, Inc., a corporation of Ohio
No Drawing. Filed Oct. 23, 1965, Ser. No. 504,067
17 Claims. (Cl. 117—72)

The present invention relates to scratch and abrasion resistant glass surfaces, and more particularly to a method of treating glass surfaces which are subjected to abrasive contact in the course of manufacturing and handling operations, to impart scratch and abrasion resistance to the glass. In a more particular aspect, the present invention relates to the treatment of glass containers which are subjected to abrasive contact in the course of handling, filling and packaging operations, to improve their resistance to abrasion and to impart scratch-resistance thereto.

In a still further aspect, the present invention relates to improved abrasion and scratch-resistant glass articles produced by the aforesaid method.

It is generally recognized that the strength of glass is derived largely from an unblemished surface, and any scratches, flaws, crevices and the like, that may be present on the surface thereof considerably decreases the strength. In fact, reductions in strength down to as little as one-fourth of the original value are not uncommon. When glass articles, particular containers, are formed, their maximum strength is developed soon after the completion of the manufacturing operation. However, the strength rapidly diminishes in the course of handling, packaging and shipping of the glass articles where they come into contact with each other and with other surfaces. Particularly acute in the food and beverage processing fields, scratching and abrasion occurs where the glass containers are subjected to various processing cycles, where the containers are successively filled, closed and packaged for delivery. In addition, many times these containers are successively washed, sterilized or vacuum-treated depending upon the particular products with which they are filled. During the course of these operations, the containers come into contact with each other and other surfaces of apparatus used in such manufacturing and handling operations, which results in a high incidence of abrasion and scratching.

As a result of the scratching and abrasion, the strength of the glass is considerably reduced, and as a result thereof, is not able to withstand the high pressures utilized in filling operations. For example, in the beverage field, containers are often filled under pressure, and where a considerable amount of abrasion and scratching has occurred, the incidence of breakage will be relatively high, which represents a serious loss of container and contents and also represents a considerable hazard.

In an effort to minimize the resulting scratching and abrading of glass surfaces during such operations as described above, various attempts have been made in the past to coat the glass surfaces with lubricant compositions. While coating compositions have been used commercially which impart satisfactory scratch resistant properties to glass containers, the properties imparted by some of these compositions are considerably reduced when the treated glass surface is wetted, either by water or steam, during the processing cycle.

Accordingly, it is an object of the present invention to provide a method for imparting scratch and abrasion resistant coatings to glass surfaces while avoiding the shortcomings and drawbacks of the prior known methods and compositions.

It is a further object of the present invention to provide a thin, substantially transparent coating on glass surfaces which coating is highly resistant to abrasion, while simultaneously substantially maintaining the strength characteristics of the glass.

It is a further object of the present invention to provide a method for coating glass surfaces, particularly glass containers, so as to impart thereto improved scratch and abrasion resistant properties, thereby permitting the glass surface to undergo normal manufacturing and handling operations with consequent rubbing of the glass surface with other surfaces without materially reducing the strength of the glass.

It is a further object of the present invention to provide a lubricant coating on glass containers which results in improved scratch and abrasion resistance properties.

It is a further object of the present invention to provide articles of manufacture having a glass surface and said surface having a highly adherent, thin, substantially colorless and transparent coating which coating imparts scratch and abrasion resistance properties to the surface.

It is a further object of the present invention to provide glassware which has on the surface thereof a thin, tightly adherent, substantially colorless and transparent scratch and abrasion resistant coating.

In attaining the objects of the invention, one feature resides in treating a glass surface with a metal-containing compound at high temperatures, which is capable of forming the oxide of the metal on the glass surface while the temperature of the glass is below the deformation temperature of the glass and preferably above the annealing point, cooling the treated glass such as in an annealing lehr, and applying to the surface of the glass at a temperature less than about 450° F., a fluorocarbon compound which bonds to the metal oxide layer on the glass to form a durable scratch and abrasion resistant coating.

A further feature of the present invention resides in treating a glass container immediately after leaving the glass forming machine with a pyrolyzable metal-containing compound which is capable of forming the oxide of the metal on the glass surface, while the surface of the glass is at a temperature at least equivalent to the pyrolyzing temperature of the metal-containing compound, therafter applying to the metal oxide coated glass surface a fluorocarbon compound to form a lubricant coating on the glass surface.

A further feature of the present invention resides in treating a glass surface with a metal-containing compound to form the corresponding metallic oxide on the glass surface and thereafter applying to the metal oxide coated glass surface a fluorocarbon compound to obtain a lubricious coating, which imparts scratch and abrasion resistance to the glass surface.

A further feature of the present invention resides in treating a glass container with a titanium compound which is pyrolyzable to form the titanium oxide coating on the glass surface while the surface of the glass is at a temperature at least equivalent to the pyrolyzing temperature of the titanium compound, cooling the treated glass in an annealing lehr, and applying to the surface a fluorocarbon compound to form a lubricious coating on the surface of the glass which imparts improved scratch and abrasion resistance to the glass container.

The above, as well as other objects, features and advantages of the present invention will become apparent from the following detailed description thereof.

According to the present invention, a glass surface of an article of manufacture such as a glass sheet, bottle, jar, tumbler, and the like, is treated soon after the article leaves the glass forming machine at a temperature below the deformation temperature of the glass. Preferably the article is treated in the first stage as it is being conveyed to the annealing lehr. However, the first stage treatment may also be carried out in the annealing lehr provided the metal compound applied to the glass is capable of forming the metal oxide coating on the glass at these temperatures. A metal-containing compound is sprayed onto the glass surface while the glass surface is at a temperature at least equal to the pyrolyzing temperature of the metal-containing compound. Pyrolysis is intended to mean chemical decomposition of the compound by heat. At this stage, the temperature of the glass surface is preferably above the annealing temperature and always below the deformation temperature of the glass. Generally, it is preferred that the temperature of the glass surface as it leaves the glass forming machine is above the pyrolyzing temperature of the metal-containing compound.

It has been found that the range of temperatures necessary to pyrolyze metal-containing compounds, particularly titanium-containing compounds, is between about 700° and 1300° F. depending upon the particular compound used, with the preferred range being from about 900° to 1200° F. It will be apparent from the foregoing that the specific temperature chosen for the application of the metal-containing compound will vary, depending upon the pyrolyzing temperature of the metal-containing compound. Metal-containing compounds suitable for purposes of the present invention are those which upon contact with the heated glass surface will react to form a substantially colorless, transparent layer or coating of the metallic oxide, which layer or coating tightly adheres to the surface of the glass and has an average thickness up to about one micron, preferably about 0.25 to 0.5 micron or less.

Particularly suitable for application at the hot end of the operation are the titanium-containing compounds which are volatile and are represented by the alkyl titanates, preferably where the alkyl group contains from about 1 to 8 carbon atoms and includes tetrabutyl titanate, tetraisopropyl titanate, tetraethylhexyl titanate, and the like. Also included among the suitable titanium containing compounds are titanium tetrahalides, particularly titanium tetrachloride.

A still further group of metal-containing compounds suitable for purposes of the present invention are tin-containing compounds. Compounds such as stannic salts including stannic halides, e.g. stannic chloride, stannic bromide and stannic iodide, and the dialkyl tin carboxylates including those having the formula:

$$R_2SN(OOCR')_2$$

wherein R and R' are alkyl groups. R may preferably contain from 1 to 8 carbon atoms while R' preferably has from 2 to 18 carbon atoms. Further examples of suitable tin compounds are found in copending applications Ser. No. 422,538 filed Dec. 31, 1964 and Ser. No. 423,304 filed Jan. 4, 1965, now abandoned, both applications being assigned to the same assignee as the present application, and the entire disclosures of which are incorporated herein by reference.

According to the preferred aspects of the present invention, after the metal oxide coating has been applied to the glass surface, the glass article moves to the annealing lehr and is progressively cooled over a period of time to about 400° F. or lower.

The second stage of the process may then be carried out by applying a fluorocarbon compound to form an adherent coating on the glass which imparts scratch and abrasion resistance thereto. The application of the fluorocarbon compound can be carried out after the annealing stage or during the annealing stage when the temperature of the glass surface is not high enough to decompose the fluorocarbon compound. The fluorocarbon compound can also be applied at ambient or room temperature. Any convenient means can be used to apply the fluorocarbon compound, i.e. spraying, brushing, dipping, etc. The concentration of the fluorocarbon compound is not critical. Generally the amount of fluorocarbon compound applied is sufficient to provide a uniform coating of adequate thickness and still maintain a transparent appearance.

Numerous fluorocarbon compounds can be used as the second coating applied to the metallic oxide coated glass surfaces, and these polymers may be applied in solution in a suitable solvent such as inert organic solvents, e.g. benzene. Moreover, the polymers can be applied in the form of solution suspension or emulsion.

A particularly satisfactory group of fluorocarbon compounds may be represented by the structural formula:

(1)
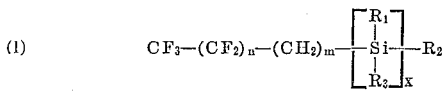

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, and at least one is alkoxy. Preferably, $R_1$, $R_2$ and $R_3$ are lower alkyl and alkoxy, and specifically contain from 1 to 3 carbon atoms in the chain.

According to the preferred aspects of the present invention, the fluorocarbon compounds are used of Formula I wherein $n$ is at least 10, $m$ is 8, $x$ is 2, $R_1$ and $R_3$ are —$OCH_3$, and $R_2$ is —$CH_3$.

The above fluorocarbon compounds form film on the surface of the glass which is at high temperature and produce the excellent scratch and abrasion-resistant coatings described heretofore. Generally, the fluorocarbon is applied in a vehicle such as carbon tetrachloride.

The following example is illustrative of the present invention and shows representative amounts and types of materials suitable for the purposes at hand and is not considered limiting thereof in any way.

*Example*

A tetrabutyltitanate solution consisting of one part by volume of titanate and two parts by volume of anhydrous n-butanol were prepared by dissolving the titanate ester at room temperature in the solvent. The solution thus obtained was sprayed, using compressed air, onto the exterior surface of glass bottles at the rate of one gallon per hour, as they were continuously being conveyed from the bottle-forming machine to the annealing lehr. The temperature of the surface of the glass containers was about 1100° F. and the titanate was pyrolyzed almost immediately. A clear, transparent coating formed upon the surface of the bottles which was hard, but the bottles could nevertheless by scratched by firmly rubbing two containers against each other.

A fluorocarbon compound identified as L–1457, manufactured by the Minnesota Mining & Manufacturing Company, which based on present information can be represented by the formula

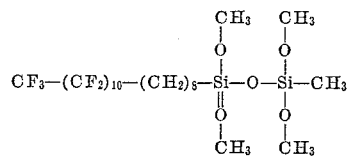

was sprayed from a dilute carbon tetrachloride solution containing approximately 0.3% by weight of the fluorocarbon compound, onto the bottles coated with the titanium oxide. The temperature of the bottles was approximately 130° C. before application of the fluorocarbon compound. The bottles were then allowed to cool at room temperature.

Bottles treated in accordance with the foregoing were tested with a scratch test machine to evaluate the effectiveness of the respective coatings. The machine is designed to abrade the surface of one glass bottle against the surface of a similar bottle. A bottle is fastened securely in a stationary set of lower chucks, while a second bottle is fastened in a set of upper chucks, which are positioned so that the axes of the bottles are at 90° relative to each other. A test load is applied to the upper bottle while it is being driven at a constant speed (e.g. 2.8 inches per minute) in a direction 45° to the axis of each bottle. The actual rate of scratch propagation on the bottles is then 2 inches per minute.

Using the test apparatus in this manner, a fresh surface is presented to the other bottle. The base of each bottle extends in the direction of motion and hence the scratch is propagated from the shoulder portion toward the base. This permits the detection of poor scratch protection in a particular section of the ware, since identical sections of each bottle are contacted.

The force exerted by the second bottle is a known measured force and, after each pass, the bottles are examined for scratches. The force, or load, in pounds was measured with respect to the scratch resistance of the dry bottles, of bottles which were wetted with water; i.e. measured while the contacting surfaces in the test machine were submerged in water. The results are set forth below and compared with the average for an untreated bottle and for a bottle treated with the fluorocarbon alone. It will be apparent that an unexpected improvement in scratch resistance is obtained as measured in load requirement to produce scratches.

| Surface Treatment | Dry (lbs.) | Wet (lbs.) |
|---|---|---|
| Titanium oxide plus fluorocarbon | 100 | 55-60 |
| Titanium oxide alone | 5 | |
| Fluorocarbon alone | 10-15 | |
| Untreated bottles | 5 | |

The foregoing tabulation of data shows that the fluorocarbon produced a lubricious coating which was resistant to scratching both in the wet and dry condition.

Further details relating to the scratch test and apparatus, therefore, are to be found in the copending application of Carl et al., Ser. No. 355,252 filed Mar. 27, 1964, now U.S. Patent 3,323,889, the entire disclosure of which is incorporated herein by reference. Various metal-containing compounds can be used for the purposes of the present invention, including tin-containing compounds, both stannous and stannic, which form tin oxide on the surface of the glass. Zirconium and vanadium are two other examples of metals which are capable of forming metallic oxides on the surface of glass containers under the conditions discussed above.

It is to be noted from the foregoing that the lubricious fluorocarbon compound may be applied to containers which do not have a metallic oxide coating thereon. Moreover, the fluorocarbon compound can be applied to containers which have various other coatings produced by other processes without departing from the scope of the present invention.

What is claimed is:

1. A method for imparting abrasion and scratch resistance to a glass surface comprising treating said surface with a metal-containing compound to form the corresponding metal oxide on said glass surface while the surface is at a temperature sufficient to form said metal oxide coating and thereafter applying to the glass surface a fluorocarbon compound represented by the structural formula:

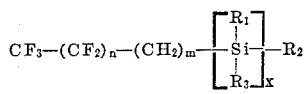

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, at least one of which is alkoxy, to form a continuous uniform and transparent coating on the glass surface.

2. A method of imparting improved scratch and abrasion resistance to a glass surface comprising treating the surface with a metal-containing compound to pyrolyze said metal-containing compound and to deposit on the glass surface the corresponding metal oxide, cooling said metal oxide coated surface to a temperature below about 450° F. and applying to the glass surface a fluorocarbon compound

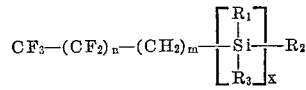

wherein $n$ is an integer with a value of 4 to 18, $m$ is an integer with a value of 1 to 10, $x$ is an integer with a value of 1 to 3, and $R_1$, $R_2$ and $R_3$ are lower alkyl or alkoxy, at least one of which is alkoxy, to form a continuous, uniform and transparent coating upon the glass surface.

3. A method as defined in claim 1 wherein the metal-containing compound is a titanium compound which forms a transparent coating of $TiO_2$ on the glass surface.

4. A method as defined in claim 1 wherein the metal-containing compound is an organic ester of titanium.

5. A method as defined in claim 1 wherein the metal-containing compound is a pyrolyzable tin compound.

6. A method for imparting abrasion and scratch resistance to a glass container comprising treating said container with a metal-containing compound to form the corresponding metal oxide on said glass container while the container is at a temperature sufficient to form said metal oxide coating and thereafter applying to the glass container a fluorocarbon compound represented by the structural formula:

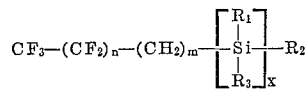

wherein $n$ is an integer with a value of 4 to 18, $m$ is an integer with a value of 1 to 10, $x$ is an integer with a value of 1 to 3, and $R_1$, $R_2$ and $R_3$ are lower alkyl or lower alkoxy containing from 1 to 3 carbon atoms, at least one of which is $-OCH_3$, to form a continuous uniform and transparent coating on the glass container.

7. A method of imparting improved scratch and abrasion resistance to a glass container comprising treating the container with a metal-containing compound to pyrolyze said metal-containing compound and to deposit on the glass container the corresponding metal oxide, cooling said metal oxide coated container to a temperature below about 450° F. and applying to the glass container a fluorocarbon compound

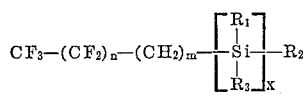

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, at least one of which is alkoxy, to form a continuous, uniform and transparent coating upon the glass container.

8. A method as defined in claim 7 wherein the metal-containing compound is a titanium compound which forms a transparent coating of $TiO_2$ on the glass surface.

9. A method as defined in claim 7 wherein the metal-containing compound is a tetra alkyl titanate containing from 1 to 8 carbon atoms per alkyl group.

10. A method as defined in claim 7 wherein the compound is tetrabutyl titanate.

11. A method as defined in claim 7 wherein the compound is tetraisopropyl tianate.

12. A method as defined in claim 7 wherein the metal-containing compound is a tin-containing compound.

13. In a method for imparting scratch resistance to glass surfaces, the improvement which comprises forming as the exterior coating on a glass surface a continuous uniform and transparent film from a fluorocarbon compound represented by the structural formula:

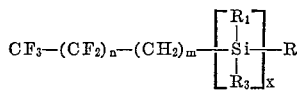

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, at least one of which is alkoxy.

14. In a method for imparting scratch resistance to glass containers, the improvement which comprises forming as the exterior coating on the glass surfaces exposed to abrasion, a continuous, uniform and transparent film by spraying the glass surfaces with an inert vehicle containing a sufficient amount of a fluorocarbon compound represented by the structural formula:

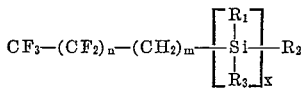

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, at least one of which is alkoxy.

15. A method for imparting improved scratch and abrasion resistance to glass containers comprising applying the glass container as the first coat, a spray containing a solution of one part by volume of tetrabutyl titanate and two parts by volume of anhydrous n-butanol while the surface temperature of the glass container is about 1100° F. to thereby pyrolyze the titanate and forming a transparent adherent coating of $TiO_2$ on the glass surface, thereafter applying as the second coat a spray containing about 0.3% by weight of

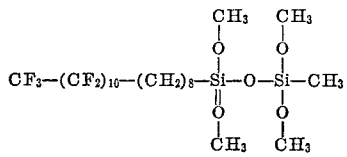

dissolved in dilute carbon tetrachloride while the surface temperature of the glass is less than about 450° F. to obtain a uniform, continuous and transparent film on said surface.

16. A scratch resistant glass surface having been treated according to the method as defined in claim 1.

17. A scratch resistant glass container having formed on its surface a thin, adherent transparent layer of a metallic oxide and as an overcoat therefor, formed from a fluorocarbon compound represented by the following formula:

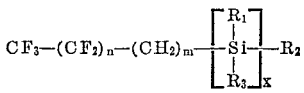

wherein $n$ is an integer with a value of 4 to 18, $m$ is an integer with a value of 1 to 10, $x$ is an integer with a value of 1 to 3, and $R_1$, $R_2$ and $R_3$ are alkyl or alkoxy, at least one of which is alkoxy, to form a continuous uniform and transparent coating on the glass surface.

References Cited
UNITED STATES PATENTS

| | | | |
|---|---|---|---|
| 2,768,909 | 10/1956 | Haszam. | |
| 2,909,548 | 10/1959 | Bailey et al. | 117—124 XR |
| 3,075,948 | 1/1963 | Santelli | 117—124 XR |
| 3,323,889 | 6/1967 | Carl et al. | 117—124 XR |

ALFRED L. LEAVITT, *Primary Examiner.*

W. F. CYRON, *Assistant Examiner.*

U.S. Cl. X.R.

117—124, 161

UNITED STATES PATENT OFFICE
CERTIFICATE OF CORRECTION

Patent No. 3,418,153                               December 24, 1968

Leon Levene

It is certified that error appears in the above identified patent and that said Letters Patent are hereby corrected as shown below:

Column 3, line 47, the formula should read -- $R_2Sn(OOCR')_2$ --. Column 4, lines 55 to 61 and column 7, lines 35 to 42, the formulas, each occurrence, should appear as shown below:

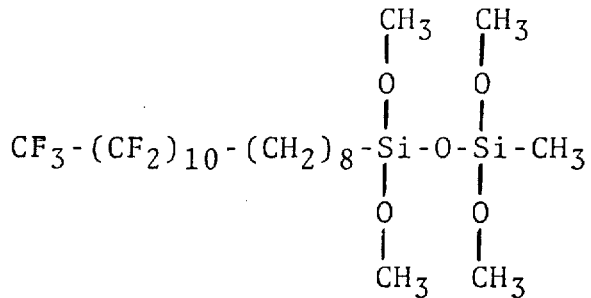

Column 7, lines 3 to 7, the formula should appear as shown below

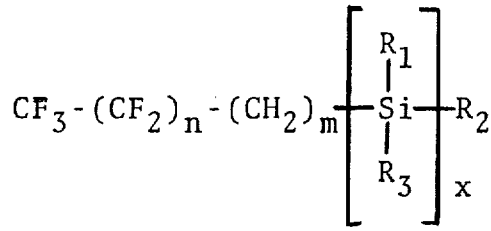

Signed and sealed this 24th day of March 1970.

(SEAL)
Attest:

EDWARD M. FLETCHER, JR.                   WILLIAM E. SCHUYLER, JR.
Attesting Officer                             Commissioner of Patents